(12) United States Patent
Tanaka

(10) Patent No.: US 7,635,259 B2
(45) Date of Patent: Dec. 22, 2009

(54) INJECTION MOLDING MACHINE HAVING A LOAD CELL DISPOSED ON A PREDETERMINED CONNECTING BAR

(75) Inventor: Kenta Tanaka, Akashi (JP)

(73) Assignee: Toyo Machinery & Metal Co., Ltd., Akashi-shi (JP)

( * ) Notice: Subject to any disclaimer, the term of this patent is extended or adjusted under 35 U.S.C. 154(b) by 219 days.

(21) Appl. No.: 11/945,535

(22) Filed: Nov. 27, 2007

(65) Prior Publication Data
US 2008/0124419 A1    May 29, 2008

(30) Foreign Application Priority Data
Nov. 27, 2006  (JP) .............................. 2006-318774

(51) Int. Cl.
*B29C 45/66* (2006.01)
(52) U.S. Cl. .................. 425/149; 425/589; 425/595
(58) Field of Classification Search .................. 425/145, 425/149, 150, 589, 595
See application file for complete search history.

(56) References Cited

U.S. PATENT DOCUMENTS

| | | | | |
|---|---|---|---|---|
| 6,866,500 | B2 * | 3/2005 | Kishi et al. .................. | 425/589 |
| 2007/0071845 | A1 * | 3/2007 | Tsuji et al. .................. | 425/149 |
| 2007/0273059 | A1 * | 11/2007 | Kestle ......................... | 425/589 |
| 2009/0026644 | A1 * | 1/2009 | Masuda et al. .............. | 425/149 |

* cited by examiner

*Primary Examiner*—Tim Heitbrink
(74) *Attorney, Agent, or Firm*—Crowell & Moring LLP

(57) ABSTRACT

A molding machine in which a load cell unit is mounted on an end portion of one of a plurality of connecting bars elastically deformable (extensionally deformable) due to a load (tensile load) during the operation of molding. At least partially any connecting bar where the load cell unit is not mounted, that is, any connecting bar other than the predetermined connecting bar where the load cell unit is mounted, includes a portion whose diameter is made a predetermined distance smaller than a diameter of the predetermined connecting bar where the load cell unit is mounted. Thus, the quantities of deformation can be equalized all over the connecting bars without using any dummy load cell unit.

3 Claims, 5 Drawing Sheets

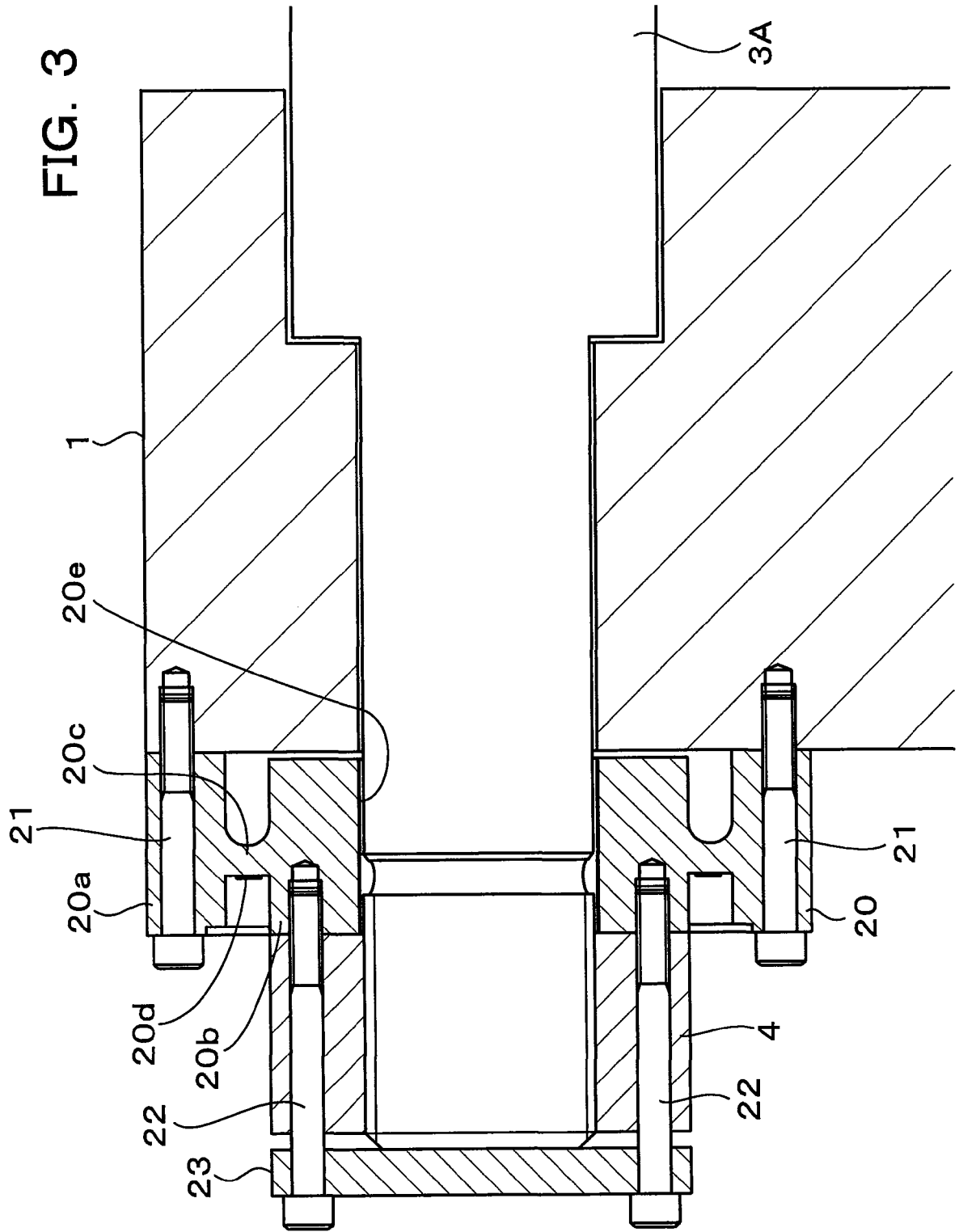

FIG. 4

CONNECTING BAR 3A

| | | |
|---|---|---|
| DIAMETER DA | mm | 110 |
| SECTIONAL AREA | cm² | 95.0 |
| LENGTH OF EXTENDABLE PORTION | mm | 1575 |
| FORCE APPLIED TO ONE BAR | kgf | 30000 |
| STRESS | kgf / cm² | 316 |
| MODULUS OF LONGITUDINAL ELASTICITY | kgf / cm² | 2.1E+06 |
| EXTENSION | mm | 0.24 |

CONNECTING BAR 3B

| | | |
|---|---|---|
| DIAMETER DB | mm | 100 |
| SECTIONAL AREA | cm² | 78.5 |
| LENGTH OF EXTENDABLE PORTION | mm | 1575 |
| FORCE APPLIED TO ONE BAR | kgf | 30000 |
| STRESS | kgf / cm² | 382 |
| MODULUS OF LONGITUDINAL ELASTICITY | kgf / cm² | 2.1E+06 |
| EXTENSION | mm | 0.29 |

| | | |
|---|---|---|
| EXTENSION OF LOAD CELL | mm | 0.05 |

| | | |
|---|---|---|
| WHOLE EXTENSION | mm | 0.29 |

INJECTION MOLDING MACHINE HAVING A LOAD CELL DISPOSED ON A PREDETERMINED CONNECTING BAR

FIELD OF THE INVENTION

The present invention relates to a molding machine such as an injection molding machine or a die-casting machine, and particularly relates to a molding machine in which a load cell unit for detecting resin pressure, mold clamping force or the like is mounted on one of a plurality of connecting bars which connect two retention blocks.

BACKGROUND OF THE INVENTION

For example, in an in-line screw type injection molding machine, the pressure of molten resin ahead (in front) of a head portion of a screw must be detected in order to control injection pressure or holding pressure during an injection step or in order to control back pressure during a metering step.

To this end, the in-line screw type injection machine is designed to detect the resin pressure with a load cell (strain detection sensor). There have been proposed various pressure detection methods (load detection methods) using load cells. According to one of the detection methods, a load cell unit is disposed between a direct-acting block moving forward/backward together with a screw and a direct-acting portion of a ball screw mechanism. A load (force) caused by resin pressure is detected by the load cell through the screw and the direct-acting block. In this method, however, the load cell unit is designed to be retained between the direct-acting block and the direct-acting portion of the ball screw mechanism for linearly driving the direct-acting block. It is therefore very troublesome to exchange the load cell unit, and it takes much time to do so.

There is also known a resin pressure detection method in which a load cell can be exchanged so easily as to enhance maintainability. According to the detection method, the load cell unit is mounted on an end portion of one of a plurality of connecting bars whose opposite ends are fixed to a head stock and a retention block respectively. The head stock retains a heating cylinder while the retention block is mounted with an injection servo motor. Thus, a load applied to the connecting bar is detected so that resin pressure can be detected. That is, in this detection method, for example, the load cell unit is disposed so that the load cell unit is loosely inserted into an end portion of a connecting bar on the head stock side while the load cell unit is placed between the head stock and a locknut fastened to the end portion of the connecting bar. Thus, the quantity of elastic deformation (quantity of strain) of an elastically deformable portion of the load cell unit is detected by a strain detection sensor pasted on the elastically deformable portion so that the load applied from resin to the connecting bar can be detected.

The connecting bars used in the background art have the same shapes with the same diameters. In the configuration where the load cell unit is mounted on an end portion of one of the connecting bars, the quantity of deformation (quantity of elastic deformation) which is the total sum of the quantity of deformation (quantity of elastic deformation) of the connecting bar where the load cell unit is mounted and the quantity of deformation (quantity of elastic deformation) of the load cell unit is therefore different from the quantity of deformation (quantity of elastic deformation) of any other connecting bar where the load cell unit is not mounted. For this reason, there arises a problem that the force applied to the injection mechanism becomes disproportionate with respect to the center of the screw axis. In order to avoid such a problem, a dummy load cell unit for producing the same quantity of deformation as that of the load cell unit may be mounted on any other connecting bar where the load cell unit is not mounted. In this manner, the quantities of deformation can be equalized to one another all over the connecting bars.

This is also applied to the configuration where a load cell unit is mounted on an end portion of one of connecting bars (tie bars) in a mold opening/closing system mechanism, that is, the configuration where a load cell unit is mounted on an end portion of one of a plurality of tie bars (connecting bars) whose opposite ends are fixed respectively to a fixed die plate mounted with a fixed mold and a tail stock mounted with a mold opening/closing servo motor. Also in this case, all the tie bars have the same shapes with the same diameters. Accordingly, the quantities of deformation cannot be equalized all over the connecting bars unless a dummy load cell unit for producing the same quantity of deformation as that of the load cell unit is mounted on any tie bar where the load cell unit is not mounted.

However, in the configuration using such a dummy load cell unit for producing the same quantity of deformation as that of the load cell unit, the number of parts increases and the number of man-hour for assembly also increases. Thus, there is a problem that the cost increases.

SUMMARY OF THE INVENTION

The present invention was developed in consideration of the foregoing problems. An object of the present invention is to provide a molding machine in which a load cell unit is mounted on an end portion of one of a plurality of connecting bars elastically deformable (extensionally deformable) due to a load (tensile load) during the operation of molding, so that the quantities of deformation can be equalized all over the connecting bars without using any dummy load cell unit.

In order to attain the foregoing object, the present invention provides a molding machine including a first retention block, a second retention block disposed oppositely to the first retention block, a plurality of connecting bars whose opposite ends are fixed to the first retention block and the second retention block respectively, a movable block which can have linear motion between the first retention block and the second retention block, a linear motion driving source for the movable block, the driving source being mounted on one of the first and second retention blocks, a force transfer mechanism for transferring force from the linear motion driving source to the movable block so as to make the movable block have linear motion, and a load cell unit disposed to be loosely inserted into an end portion of a predetermined one of the plurality of connecting bars and placed between one of the first and second retention blocks and a locknut fastened to the end portion of the predetermined connecting bar, wherein at least partially any connecting bar where the load cell unit is not mounted, that is, any connecting bar other than the predetermined connecting bar includes a portion whose diameter is made smaller than a diameter of the predetermined connecting bar by a predetermined distance.

According to the present invention, in a molding machine in which a load cell unit is mounted on an end portion of one of a plurality of connecting bars elastically deformable (extensionally deformable) due to a load (tensile load) during the operation of molding, at least partially any other connecting bar where the load cell unit is not mounted includes a portion whose diameter is made a predetermined distance smaller than a diameter of the predetermined connecting bar where the load cell unit is mounted. Each of the other connecting bars has a portion whose diameter is smaller than the diameter of the predetermined connecting bar. If the load cell unit is absent, the quantity of deformation (quantity of elastic deformation) of any other connecting bar will be larger than the quantity of deformation (quantity of elastic deformation) of the predetermined connecting bar due to the portion whose diameter is smaller than the diameter of the predetermined connecting bar. However, when the load cell unit is mounted on the predetermined connecting bar, the total quantity of deformation (quantity of elastic deformation) which is the sum of the quantity of deformation (quantity of elastic deformation) of the predetermined connecting bar and the quantity of deformation (quantity of elastic deformation) of the load cell unit can be equalized with the quantity of deformation (quantity of elastic deformation) of any other connecting bar where the load cell unit is not mounted. Accordingly, the quantities of deformation can be equalized all over the connecting bars without using any dummy load cell unit. It is therefore possible to reduce the cost on a large scale in comparison with that in the configuration where dummy load cell units are used.

BRIEF DESCRIPTION OF THE DRAWINGS

FIG. 3 is a main portion sectional view showing a mounting structure of a load cell unit in the injection molding machine according to the embodiment of the present invention;

FIG. 4 is a table showing the quantities of elastic deformation (quantities of extension) of two connecting bars and the quantity of elastic deformation (quantity of extension) of the load cell unit in the injection molding machine according to the embodiment of the present invention.

DETAILED DESCRIPTION OF THE EMBODIMENTS

Embodiments of the present invention will be described below with reference to the drawings.

Figure 1:
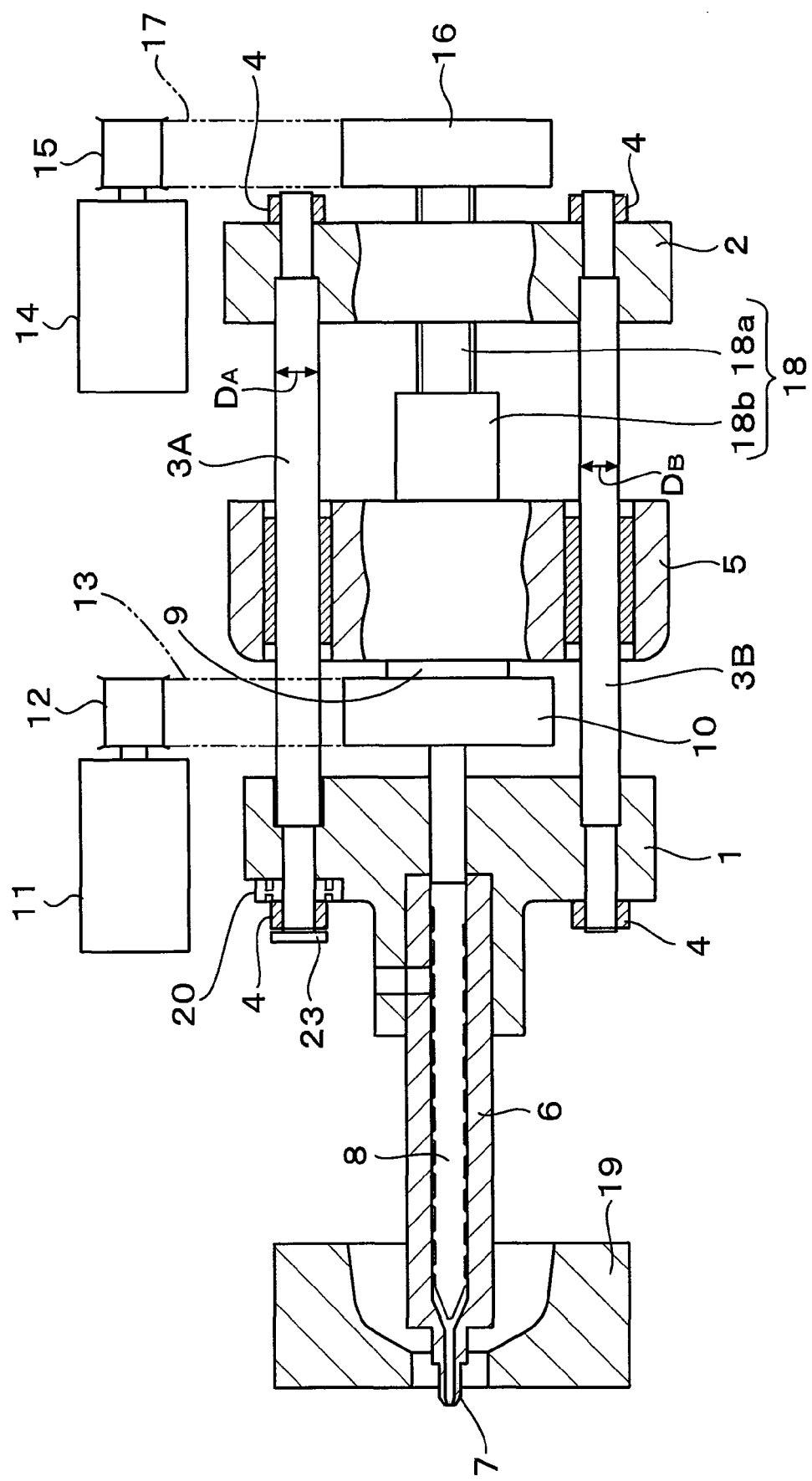
FIG. 1 is a main portion front view of an injection system mechanism in a horizontal in-line screw type electric injection molding machine according to an embodiment of the present invention.

FIGS. 1 to 4 show a horizontal in-line screw type electric injection molding machine according to an embodiment (hereinafter referred to as "this embodiment") of the present invention. FIG. 1 is a main portion front view of an injection system mechanism in the injection molding machine according to this embodiment.

In FIG. 1, a head stock 1, for example, serving as a first retention block, is disposed on a not-shown injection system base member provided on a not-shown machine main frame. A retention plate 2, for example, serving as a second retention block, is disposed on the not-shown injection system base member provided on the not-shown machine main frame so that the retention plate 2 is opposed to the head stock 1. A plurality of connecting bars 3A and 3B are laid between the head stock 1 and the retention plate 2. The opposite ends of each connecting bar 3A, 3B are fixed to the head stock 1 and the retention plate 2 by locknuts (fastening nuts) 4 respectively. The connecting bars include one connecting bar 3A and three connecting bars 3B. The connecting bar 3A is set to be as long as each connecting bar 3B. The opposite ends of the connecting bar 3A are set to have the same shapes as those of each connecting bar 3B, while the diameter of a main portion of each connecting bar 3B is set to be thinner (smaller) than that of the connecting bar 3A (the relation $D_A > D_B$ is established when $D_A$ designates the diameter of the main portion of the connecting bar 3A and $D_B$ designates the diameter of the main portion of the connecting bar 3B). Thus, a load cell unit can be mounted on the connecting bar 3A as will be described later.

A direct-acting block 5 serving as a movable block is inserted into and guided by the connecting bars 3A and 3B so as to be able to move forward/backward (or have linear motion) between the head stock 1 and the retention plate 2. A heating cylinder 6 is fixed to the head stock 1 in its rear portion. A nozzle 7 is fixed to the front end of the heating cylinder 6 (the nozzle 7 is illustrated as a member integrated with the heating cylinder 6, but in fact the nozzle 7 is constituted by a separate member which can be fixed to the heating cylinder 6). A screw 8 is disposed in the heating cylinder 6 so as to be able to rotate and move forward/backward. A rotor 9 fixes the rear end of the screw 8 and is rotatably retained in the direct-acting block 5. A driven pulley 10 is fixed to the rotor 9 or formed integrally with the rotor 9. A metering servo motor 11 is mounted on the direct-acting block 5. A driving pulley 12 is fixed to the output shaft of the metering servo motor 11. A timing belt 13 transfers the rotation of the driving pulley 12 (that is, the rotation of the measuring servo motor 11) to the driven pulley 10.

An injection servo motor 14 is mounted on the retention plate 2. A driving pulley 15 is fixed to the output shaft of the injection servo motor 14. The rotation of the injection servo motor 14 is transferred to a driven pulley 16 through the driving pulley 15 and a timing belt 17. A ball screw mechanism 18 converts the rotation of the driven pulley 16 (that is, the rotation of the injection servo motor 14) into linear motion. A screw shaft 18a of the ball screw mechanism 18 is rotatably retained on the retention plate 2 while the driven pulley 16 is fixed to an end portion of the screw shaft 18a. A nut 18b of the ball screw mechanism 18 is screwed down to the screw shaft 18a and fixed to the direct-acting block 5.

A fixed die plate 19 is mounted with a not-shown fixed mold. The fixed die plate 19 serves as a part of a mold opening/closing system mechanism.

In the configuration shown in FIG. 1, the whole of the injection system mechanism is moved forward on a not-shown injection system base member by a not-shown nozzle touch/back motor and a not-shown nozzle touch/back mechanism during the operation of molding. By a predetermined force, the nozzle 7 at the front end of the heating cylinder 6 is pressed onto the vicinity of a resin injection port of the not-shown fixed mold attached to the fixed die plate 19. In such a nozzle touch state, the screw 8 is driven and rotated by the metering servo motor 11 in a metering step. Thus, raw resin supplied to the base side of the screw 8 is conveyed to the head portion side of the screw 8 by the screw driving action of the screw 8 while being kneaded and plasticized. As the molten resin is accumulated in front (ahead) of the head portion of the screw 8, the screw 8 is moved backward. When the screw 8 is moved backward in this manner, the injection servo motor 14 comes under pressure feedback control so that the back pressure is controlled. As soon as a predetermined amount of the molten resin is accumulated ahead (in front) of the head portion of the screw 8, the rotation of the screw 8 is stopped. On the other hand, at the time of injection, the injection servo motor 14 is driven and rotated in a predetermined direction so that the nut 18b of the ball screw mechanism 18 is driven and moved forward. Thus, the screw 8 is driven and moved forward integrally with the direct-acting block 5 so that the molten resin accumulated ahead of the head portion of the screw 8 is injected and filled into the mold. During this injection, the molten resin is controlled to have high pressure, and a large tensile load is applied to the connecting bars 3A and 3B by the high pressure from the molten resin.

Figure 2:
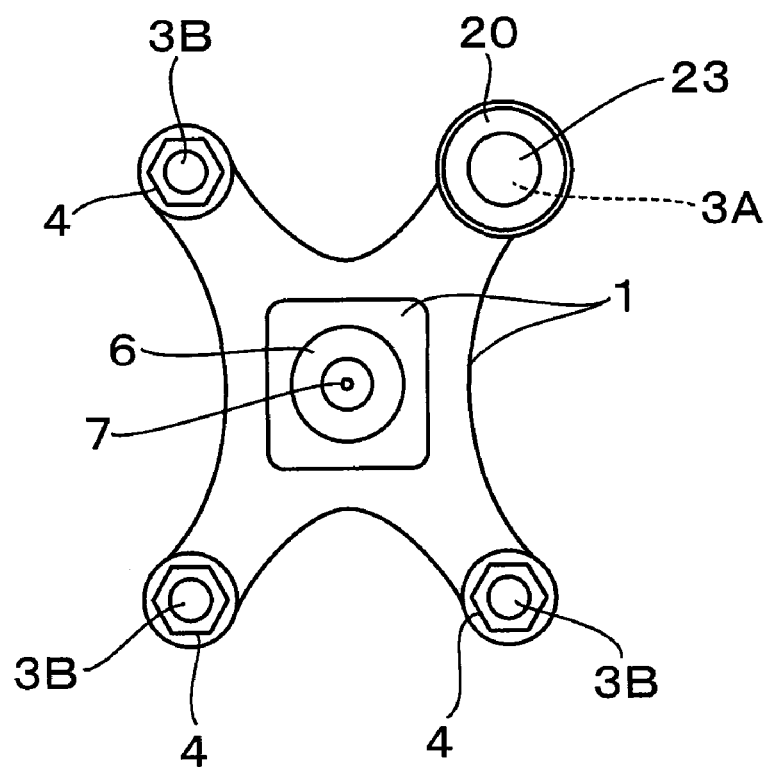
FIG. 2 is a simplified main portion side view of the injection system mechanism in the injection molding machine according to the embodiment of the present invention.

FIG. 2 is a main portion side view of the injection system mechanism. As shown in FIG. 2, a load cell unit 20 is mounted only on one end side of the connecting bar 3A on one surface side of the head stock 1.

FIG. 3 shows the details of the mounting structure of the load cell unit 20. As shown in FIG. 3, the load cell unit 20 has an outer ring portion 20a, an inner ring portion 20b, a thin plate portion 20c, a strain sensor 20d and a central through hole 20e. The thin plate portion 20c connects the outer ring portion 20a and the inner ring portion 20b. The strain sensor 20d is pasted on the thin plate portion 20c. The quantity of elastic deformation (quantity of strain) of the thin plate portion 20c is detected by the strain sensor 20d so that a load (pressure) can be detected. The inner ring portion 20b of the load cell unit 20 is fitted loosely with a predetermined clearance to the outer circumference of one end portion of the connecting bar 3A projecting over the head stock 1. The outer ring portion 20a is brought into tight contact with the head stock 1. The inner ring portion 20b is brought into tight contact with the locknut 4 which is screwed and fastened to a threaded portion of the one end portion of the connecting bar 3A so as to be fixed to the one end portion of the connecting bar 3A. The outer ring portion 20a of the load cell unit 20 is fixed to the head stock 1 by a fastening bolt 21. The inner ring portion 20b is fixed to the locknut 4 by a fastening bolt 22. The fastening bolt 22 penetrates a nut falling-off preventing plate 23 and the locknut 4 and the front end of the fastening bolt 22 is screwed and fastened to the inner ring portion 20b. The nut falling-off preventing plate 23 is in contact with one end surface of the connecting/guiding bar 3A.

Due to such a mounting structure of the load cell unit 20, the force (load) caused by the pressure of the molten resin accumulated ahead of the head portion of the screw 8 is transferred to the load cell unit 20 through the nozzle 7, the heating cylinder 6 and the head stock 1. The force (load) caused by the molten resin can be detected by the strain sensor 20d provided on the thin plate portion 20c of the load cell unit 20 (here the force (load) caused by the pressure of the molten resin is detected as a tensile load).

In this embodiment, as described previously, the connecting bar 3A where the load cell unit 20 is mounted is as long as any of the other three connecting bars 3B where the load cell unit 20 is not mounted. However, the diameter of the main portion of each connecting bar 3B is set to be thinner (smaller) than that of the connecting bar 3A. The diameter $D_A$ of the main portion of the connecting bar 3A is set to be 110 mm, and the diameter $D_B$ of the main portion of each connecting bar 3B is set to be 100 mm. In the injection molding machine according to this embodiment, the maximum injection pressure is 120,000 kgf (120 ton). Therefore, the force applied to each of the four connecting bars 3A and 3B is up to 30,000 kgf.

FIG. 4 is a table showing the quantity of elastic deformation (quantity of extension) of the connecting bar 3A, the quantity of elastic deformation (quantity of extension) of each connecting bar 3B and the quantity of elastic deformation (quantity of extension) of the load cell unit 20 in this embodiment. As is apparent from FIG. 4, when the quantity of extension of the connecting bar 3A is compared with that of each connecting bar 3B in no consideration of the quantity of elastic deformation (quantity of extension) of the load cell unit 20, the quantity of extension of the connecting bar 3A is 0.24 mm and the quantity of extension of the connecting bar 3B is 0.29 mm because the diameter $D_A$ of the main portion of the connecting bar 3A is larger than the diameter $D_B$ of the main portion of the connecting bar 3B. That is, the quantity of extension of the connecting bar 3B is larger than the quantity of extension of the connecting bar 3A. However, when suffering a force of 30,000 kgf, the load cell unit 20 is elastically deformed (extended) by 0.05 mm. The total quantity of extension is therefore 0.29 mm, which is the sum of the quantity of extension of the connecting bar 3A and the quantity of extension of the load cell unit 20. Thus, the total quantity of extension is equal to the quantity of extension 0.29 mm of the connecting bar 3B where the load cell unit 20 is not mounted. In this manner, the quantities of deformation can be equalized all over the connecting bars without mounting a dummy load cell unit on each connecting bar 3B. It is therefore possible to reduce the cost on a large scale in comparison with that in the configuration where dummy load cell units are used. In FIG. 4, the opposite end portions of the connecting bar 3A and the opposite end portions of the connecting bars 3B are omitted for the sake of simplification of explanation. In fact the quantity of extension of the opposite end portions of the connecting bar 3A is equal to the quantity of extension of the opposite end portions of each connecting bar 3B. The quantity of extension of the connecting bar 3A and the quantity of extension of the connecting bar 3B shown in FIG. 4 are expressed by numeric values calculated in consideration of the opposite end portions of the respective connecting bars.

Figure 5:
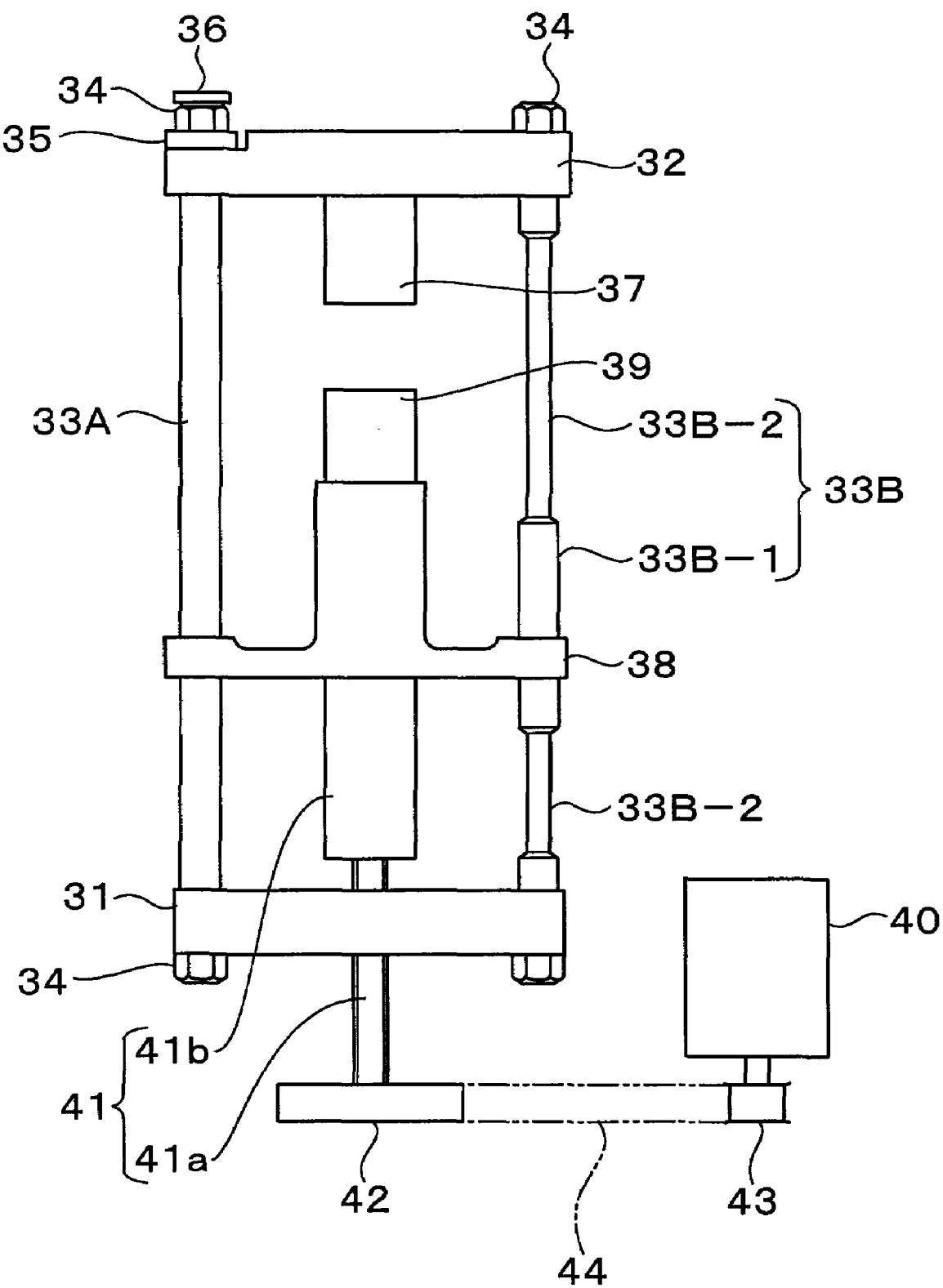
FIG. 5 is a simplified front view of a mold opening/closing system mechanism in an injection molding machine according to another embodiment of the present invention.

FIG. 5 is a simplified front view of a mold opening/closing system mechanism in a vertical electric injection molding machine according to another embodiment (hereinafter referred to as "this embodiment") of the present invention.

In FIG. 5, a tail stock 31 is retained on a not-shown suitable frame member. The tail stock 31, for example, serves as a first retention block. A fixed die plate 32 is disposed in opposition to the tail stock 31. The fixed die plate 32, for example, serves as a second retention block. A plurality of tie bars 33A and 33B serving as connecting bars are laid between the tail stock 31 and the fixed die plate 32. The opposite ends of each connecting bar 33A, 33B are fixed to the tail stock 31 and the fixed die plate 32 by locknuts (fastening nuts) 34 respectively. The tie bars include one tie bar 33A and three tie bars 33B. In the same mounting method as the aforementioned mounting method in FIG. 3, a load cell unit 35 configured in the same manner as the aforementioned load cell unit 20 is mounted on an end of the tie bar 33A projecting over the fixed die plate 32. The reference numeral 36 represents a falling-off preventing plate configured in the same manner as the aforementioned falling-off preventing plate 23.

A fixed mold 37 is mounted on the fixed die plate 32. A movable die plate 38 serves as a movable block, which is inserted into and guided by the tie bars 33A and 33B so as to be able to move forward/backward (or have linear motion) between the tail stock 31 and the fixed die plate 32. A movable mold 39 is mounted on the movable die plate 38. A mold opening/closing servo motor 40 is mounted on the tail stock 31. A ball screw mechanism 41 converts the rotation of the mold opening/closing servo motor 40 into linear motion and transfers the linear motion to the movable die plate 38. A screw shaft 41a of the ball screw mechanism 41 is rotatably retained on the tail stock 31. A nut 41b of the ball screw mechanism 41 is screwed down to the screw shaft 41a. An end portion of the nut 41b is fixed to the movable die plate 38. A driven pulley 42 is fixed to an end portion of the screw shaft 41a. A driving pulley 43 is fixed to the output shaft of the mold opening/closing servo motor 40. A timing belt 44 transfers the rotation of the driving pulley 43 (that is, the rotation of the mold opening/closing servo motor 40) to the driven pulley 42.

In the configuration shown in FIG. 5, the mold opening/closing servo motor 40 is driven and rotated in a predetermined direction at the time of the operation of mold closing or mold clamping, so that the movable die plate 38 moves forward (rises). Thus, the operation of mold closing advances so that the movable mold 39 touches the fixed mold 37. After the mold touch, the mold opening/closing servo motor 40 is driven and rotated in the predetermined direction further by a predetermined distance. Thus, a predetermined mold clamping force is applied to the two molds 37 and 39. Due to the mold clamping, a large tensile load is applied to the tie bars 33A and 33B.

Here, in this embodiment, the tie bar 33A is set to be as long as each tie bar 33B, and the opposite ends of the tie bar 33A are also set to have the same shapes as those of each tie bar 33B. In this embodiment, the main portion of the tie bar 33A is set to have one and the same diameter all over its length, while the main portion of each tie bar 33B is provided with a portion 33B-1 whose diameter is equal to that of the main portion of the tie bar 33A and a portion 33B-2 whose diameter is smaller than that of the main portion of the tie bar 33A. Thus, the total quantity of extension which is the sum of the quantity of extension of the tie bar 33A and the quantity of extension of the load cell unit 35 is equalized with the quantity of extension of each tie bar 33B.

Accordingly, also in this embodiment, the quantities of deformation can be equalized all over the tie bars without mounting any dummy load unit to any tie bar 33B, in the same manner as the aforementioned embodiment. It is therefore possible to reduce the cost on a large scale in comparison with that in the configuration where dummy load cell units are used. Further, in this embodiment, the portion 33B-1 whose diameter is equal to that of the main portion of the tie bar 33A and the portion 33B-2 whose diameter is smaller than that of the main portion of the tie bar 33A are provided in each tie bar 33B where the load cell unit is not mounted. When a not-shown sliding bush is designed to slide on the portion 33B-1 of each tie bar 33B whose diameter is equal to that of the main portion of the tie bar 33A, the bush can be also used as a not-shown sliding bush which should slide on the tie bar 33A. It is therefore possible to relieve labor such as procurement of bushes.

In the aforementioned embodiments, the present invention was applied to an injection system mechanism of a horizontal injection molding machine or a mold opening/closing system mechanism of a vertical injection molding machine by way of example. However, it goes without saying that the present invention can be also applied to an injection system mechanism of a vertical injection molding machine or a mold opening/closing system mechanism of a horizontal injection molding machine. The aforementioned embodiments showed application to injection molding machines. However, it goes without saying that the present invention can be also applied to an injection system mechanism or a mold opening/closing system mechanism of a die-casting machine.

What is claimed is:

1. A molding machine comprising:
   a first retention block;
   a second retention block disposed oppositely to the first retention block;
   a plurality of connecting bars whose opposite ends are fixed to the first retention block and the second retention block respectively;
   a movable block which can have linear motion between the first retention block and the second retention block;
   a linear motion driving source for the movable block, the driving source being mounted on one of the first and second retention blocks;
   a force transfer mechanism for transferring force from the linear motion driving source to the movable block so as to make the movable block have linear motion; and
   a load cell unit disposed to be loosely inserted into an end portion of a predetermined one of the plurality of connecting bars and placed between one of the first and second retention blocks and a locknut fastened to the end portion of the predetermined connecting bar;
   wherein at least partially any connecting bar where the load cell unit is not mounted, that is, any connecting bar other than the predetermined connecting bar includes a portion whose diameter is made smaller than a diameter of the predetermined connecting bar by a predetermined distance.

2. A molding machine according to claim 1, wherein the movable block is a direct-acting block moving forward/backward integrally with an injection member which can move forward/backward in the heating cylinder.

3. A molding machine according to claim 1, wherein the movable block is a movable die plate mounted with a movable mold and moving forward/backward integrally with the movable mold.

* * * * *